Dec. 3, 1968  R. A. CORVINO  3,414,155
WALLS FOR LIQUEFIED GAS STORAGE TANKS
Filed Aug. 25, 1966  4 Sheets-Sheet 1
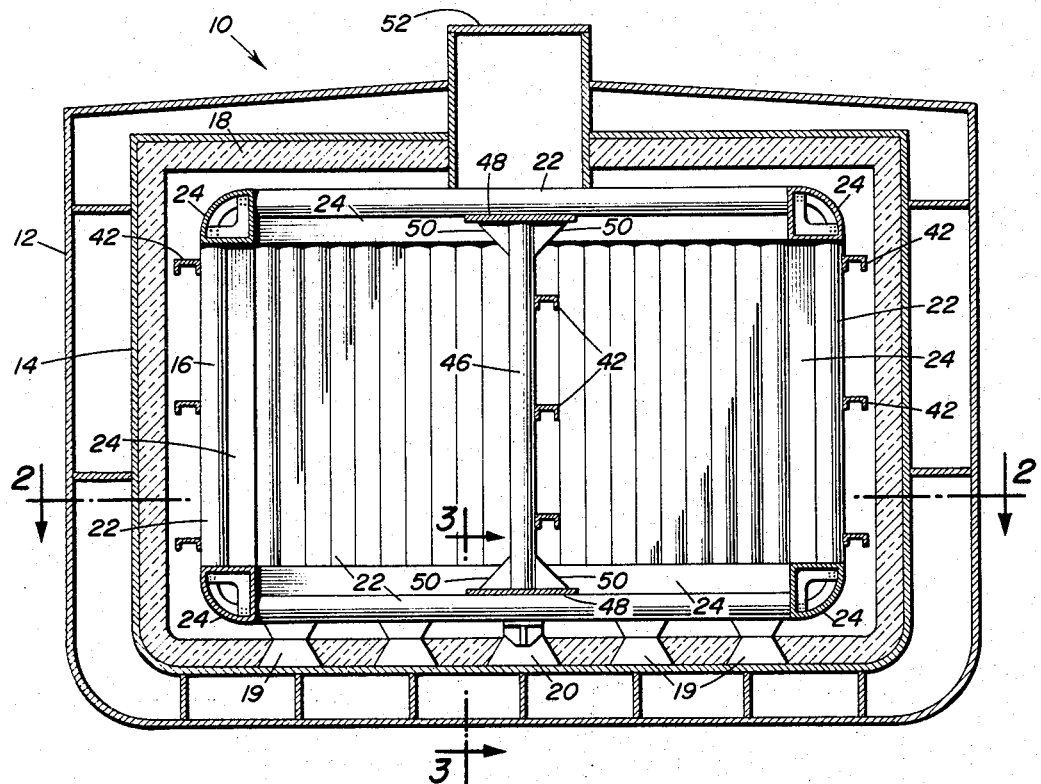
FIG. 1.
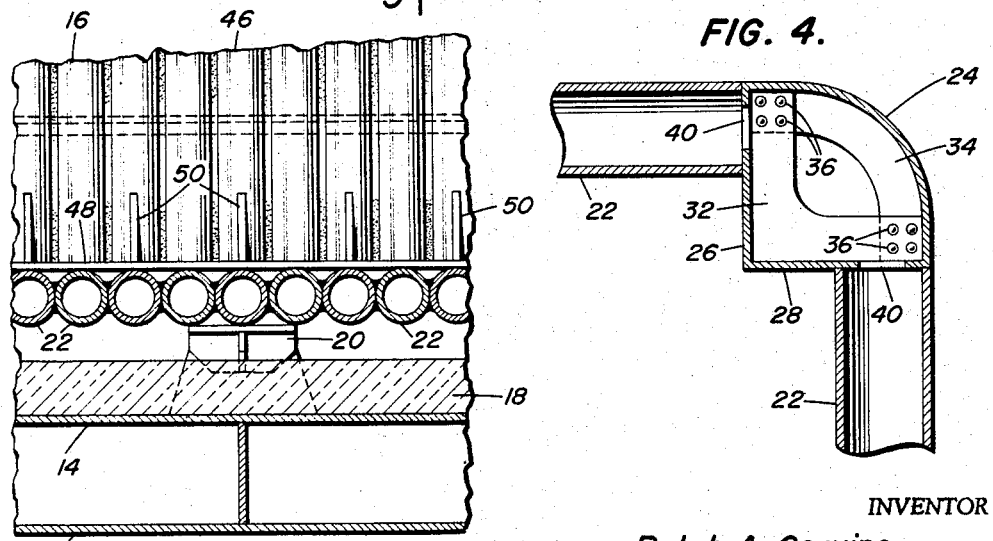
FIG. 3.
FIG. 4.
INVENTOR
Ralph A. Corvino
BY Stevens, Davis, Miller & Mosher
ATTORNEYS INVENTOR
Ralph A. Corvino Dec. 3, 1968  R. A. CORVINO  3,414,155
WALLS FOR LIQUEFIED GAS STORAGE TANKS
Filed Aug. 25, 1966  4 Sheets-Sheet 3

INVENTOR
Ralph A. Corvino

BY Stevens, Davis, Miller & Mosher
ATTORNEYS

Dec. 3, 1968    R. A. CORVINO    3,414,155
WALLS FOR LIQUEFIED GAS STORAGE TANKS
Filed Aug. 25, 1966    4 Sheets-Sheet 4

INVENTOR
Ralph A. Corvino

BY Stevens, Davis, Miller & Mosher
ATTORNEYS

United States Patent Office 3,414,155
Patented Dec. 3, 1968

3,414,155
WALLS FOR LIQUEFIED GAS STORAGE TANKS
Ralph A. Corvino, Spring Valley, N.Y., assignor to
John J. McMullen, Montclair, N.J.
Filed Aug. 25, 1966, Ser. No. 575,110
14 Claims. (Cl. 220—5)

ABSTRACT OF THE DISCLOSURE

A storage tank for storing liquefied gas at about ambient pressure comprising a top, a bottom, four upstanding walls, each of tubular construction being formed of a plurality of parallel pipes with their axes aligned with the plane of the wall and joining means connecting adjacent pipes together to form a liquid-tight barrier comprising at least in part a weld for each pipe which extends parallel to the axis of each pipe and runs longitudinally along a part of the outside surface of the pipe, and a plurality of stiffening members mounted to the walls of the tank extending horizontally and being spaced vertically.

---

The present invention relates to liquefied gas storage tanks and the like and more particularly to tanks for storing or transporting liquefied gas at about ambient pressure.

While the invention has special advantages in connection with the transportation of such liquefied gases, it is also adapted for use in stationary storage tanks.

Normally, tanks of the type described for transporting liquefied gases such as methane and the like comprise a liquid containing tank made of aluminum alloy or nickel steel alloy. The tank is usually of flat plate construction supported by beds of load bearing insulation such as balsa wood. Additional layers of insulation, either non-porous or covered with aluminum sheathing, are provided to prevent heat transfer to the outer walls and top of the tank and act as a secondary or backup barrier in the event leaks occur in the tank walls.

Although providing adequate service, this conventional construction has not been free of problems. The flat plate design requires either that the insulation space between the tank walls and the ship structure be completely filled with load bearing insulation or alternately that large numbers of vertical and horizontal stiffening members be welded to the tank walls so that adequate bending modulus is provided. Thus, the construction of such a tank is not easily accomplished and many man hours of manual welding are required which increases the cost and the time of construction. In addition, with insulation abutting the outer tank wall, inspection, maintenance, and X-raying of the tank walls is made more difficult.

The present invention solves these problems by providing a new and improved tank of the type described which includes a tubular wall construction made of sections of welded vertical pipe connected by the welds themselves of various welded web configurations. Although there are large numbers and lengths of welds in each wall section, section construction and assembly times are held to a minimum by virtue of pre-fabrication and well known automatic welding techniques. The wall sections or panels are then transported to the place of tank assembly where the sections are welded together to form a single integral tank.

It is, therefore, an object of the present invention to provide a new and improved tubular wall construction for tanks of the type described which is less expensive and quick to assemble.

It is another object of the present invention to provide a tank wall construction which has an inherently better section modulus so as to require less supporting and reinforcing structures such as gussets, stiffeners, and the like.

Other and further objects of the present invention will become apparent with the following detailed description when taken in view of the appended drawings in which:

FIGURE 1 is a typical vertical transverse section of a ship containing a tank built in accordance with the present invention;

FIGURE 3 is a typical vertical longitudinal section talen along line 3—3 of FIGURE 1 illustrating a part of the bottom wall construction and bottom of the longitudinal center line bulkhead;

FIGURE 4 is a typical vertical transverse section of one of the box girders along an upper edge of the tank.

Figure 2:
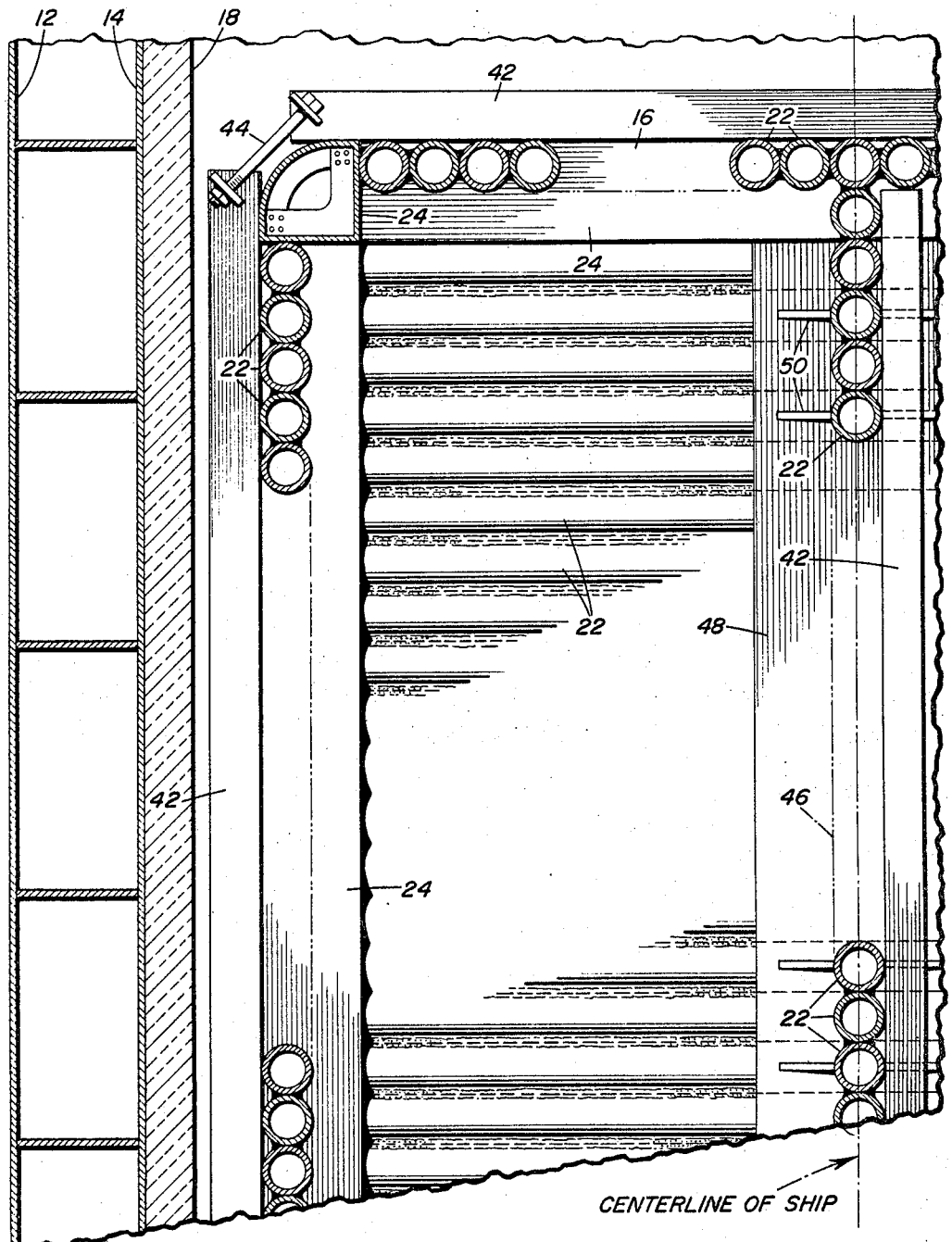
FIGURE 2 is a typical horizontal section taken along line 2—2 of FIGURE 1.

Referring to the drawings in detail, a liquefied gas transport ship 10 having an outer skin 12 and an inner hull 14 houses a cargo storage tank 16. In order to protect the inner hull 14 which is made of soft carbon steel from the low temperatures associated with tank 16, insulation 18 which may be in the form of balsa wood, or the like, completely lines the inner walls of hull 14. Tank 16 is supported within the ship by any suitable means such as beds of load bearing insulation or a plurality of insulated pillars 19 and keys 20 which permit thermal expansion and contraction while maintaining the proper alignment of tank 16 relative to the ship. In the event pillars and keys are used for tank support, it may be desirable to provide a system of vertical web rings running transversely within tank 16 to distribute the supporting loads to the walls thereof. For a more complete disclosure of such a supporting system see the copending patent application entitled Arrangement for Protecting Liquefied Gas Transporting Vehicles, Ser. No. 544,979, filed Apr. 25, 1966, now Patent No. 3,374,641, and assigned to the same assignee.

Figure 5:
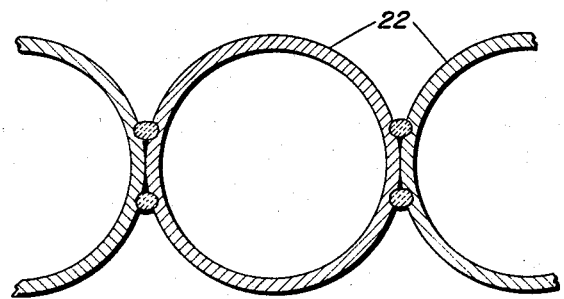
FIGURES 5–10 are transverse sections of various types of wall constructions in accordance with the present invention, each type providing a double barrier at all parts of the wall.
Figure 6:
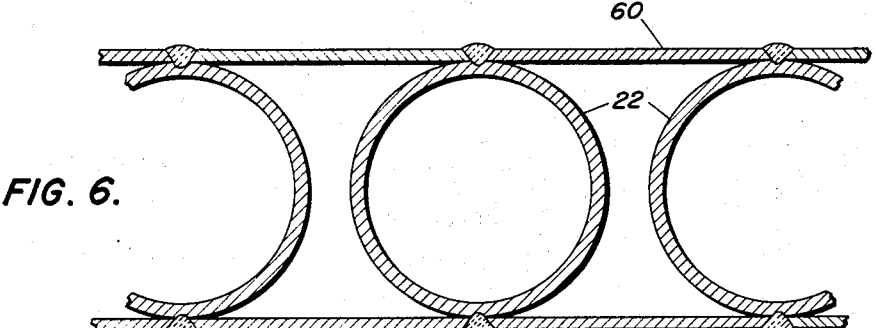

In accordance with the present invention, the wall construction of tank 16 includes a plurality of seamless pipe or tubing positioned side-by-side with axes parallel in any one wall and welded together in the manner described below. The cross section of one preferred embodiment of this tubular construction is shown in FIGURE 5 and comprises a plurality of pipe laid side-by-side with a pair of welds running the length thereof, each weld made where the tubular profiles become closest and each weld spanning parts of the adjacent tank. In welding the pipe together in a well-known manner, a plurality of pipe is laid side-by-side on rack-like supports and arc welded either by single or multiple weld bead technique at approximately the weld portion shown typically in FIGURE 5. The associated pipe is then integrally and solidly jointed together. The process is repeated to form a plurality of similar welded seams on the other side of the plurality of pipes. The conventional welding techniques that are commonly known in the trade as M.I.G. or submerged arc welding can be used with the procedure described above.

The axes of tubes 22 in the upstanding walls of the tank 16 are vertical while the tubes in the top and bottom of the tank extend athwartship. The length, diameter, and thickness of each pipe can be of any suitable values and a pipe of, for example, 36 inches in diameter is preferred for large tanks of this type. Small sized pipe can, of course, be used in smaller sized tanks.

Hollow box girders 24 extend along all vertical and horizontal edges to provide support and load transition from one wall to adjacent walls. As better seen in FIGURE 4, each box girder comprises a pair of plates 26 and 28 arranged at right angles to each other forming the innermost corner of the girder. A third rounded plate has a pair of legs each welded to one of the plates 26 and 28 to complete the box. All welds form fluid-tight seams. Girder 24 is stiffened vertically at suitable locations by a pair of elbows 32 and 34 having their outer edges welded respectively to plates 26, 28 and plate 30 and their overlapping parts mechanically connected by bolts 36 or the like. Elbows 32 and 34 form an opening 38 which acts as a crawl space permitting manual access anywhere within girder 24.

Pipes 22 are welded to plates 26 and 28, preferably near the outer extremity thereof. Plates 26 and 28 are provided with a plurality of openings 40 each of which communicate with the interior of one of the pipes 22. In this way, box girder 24 acts as a supply or return header for the interior of pipes 22 so that the spaces therein can be inerted, purged, or otherwise treated, in the cool-down and warm-up processes normally associated with these tanks.

In addition when the tank walls are being inspected for cracks, conventional and well known ultra-sonic or radiographic testing can be performed internally by passing the energy source through openings 40 into the interior of each tube 22.

The tubular wall construction of tank 16 inherently provides all the necessary vertical stiffening required for tanks of this type. In addition, this construction provides a good section modulus so that large numbers of auxiliary horizontal stiffening members are not needed. However, in the event additional horizontal stiffening is desired, U-shaped channels 42 can be welded on the outer part of the tank wall generally as shown. With reference to FIGURE 2, channels 42 need not be continuous and can terminate at the tank corners generally as shown. A tensioning rod or cable 44 having one or both ends bolted to joining channels 42 may be provided to draw or compress the edges of the channels toward each other. The lateral dimension of each channel 42 can be of a suitable value, however, it is preferred that the outer edge of the channel be out of contact with insulation 18.

As seen in FIGURE 1, channels 42 are provided at three vertical locations on the outer walls of tank 16. Commensurate with the particular dimension and design of the tank, additional channels 42 can be welded to the inner sides of wall pipe 22 in addition or in place of those channels on the outside of the tank.

Tank 16 is also provided with a center line bulkhead 46 also formed of tubular wall sections similar to walls 22. Bulkhead 46 serves to divide the tank into two longitudinal compartments. Additional transverse liquid tight or transverse swash bulkheads (not shown) can be provided to further divide the tank and prevent uncontrolled swinging of the liquid cargo. In order to further distribute the loading forces, an elongated flat plate 48 is positioned along the tanks center line between the bottom of bulkhead 46 and the tops of pipes 22 in the tank bottom. Plate 48 extends from the forward box girder of tank 16 to the afterbox girder thereof and presents a flat surface on which bulkhead 46 is securely mounted. Every other pipe of bulkhead 46 is provided with a pair of corner gussets 50 welded to plate 48 and the respective pipe to further distribute the load. If desired, all pipes of bulkhead 46 can be provided with these gussets. A similar plate 48 and joining arrangement is provided for the top of bulkhead 46 and the top of the tank. Additional channels 42 can be welded to bulkhead 46 when necessary or desirable.

Tank 16 is provided with a conventional central trunk 52 which accommodates various pipes and fittings for the cooling down and warming up, loading and unloading of tank 16.

With reference to FIGURES 6 through 10, various modifications of the tubular tank wall construction are illustrated. These modifications can be made in the manner described above. In the construction shown in FIGURE 6, unlike that of FIGURE 5, the tubes are spaced from one another and have flat plates 60 parallel to the plane of the respective wall welded to the outer and inner extremities of pipe 22.

Figure 7:
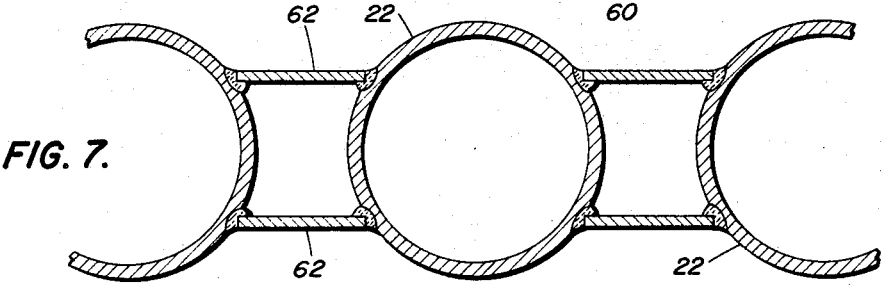

In FIGURE 7 a pair of elongated members 62 are spaced outward and inward from each other and have their respective edges welded to adjacent pipe members 22, at positions intermediate the axes and outer and inner extremities of the pipe.

Figure 8:
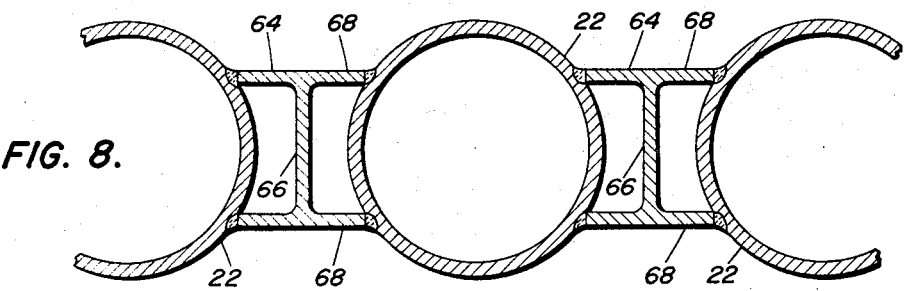

In FIGURE 8 an elongated member 64 of I-beam construction which includes an interconnecting web 66 and a pair of flanges 68 has its lateral edges welded to adjacent pipe 22.

Figure 9:
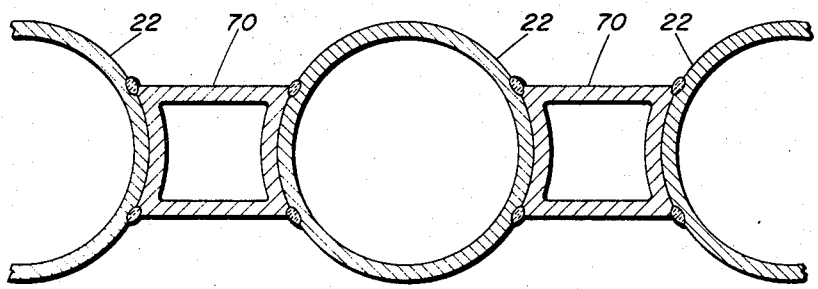

In FIGURE 9, pipe 22 is separated by an elongated hollow box member 70, the lateral sides of which are concave to receive the rounded parts of adjacent pipe 22. The edges of member 70 are welded to the adjacent pipe 22 in the manner described.

Figure 10:
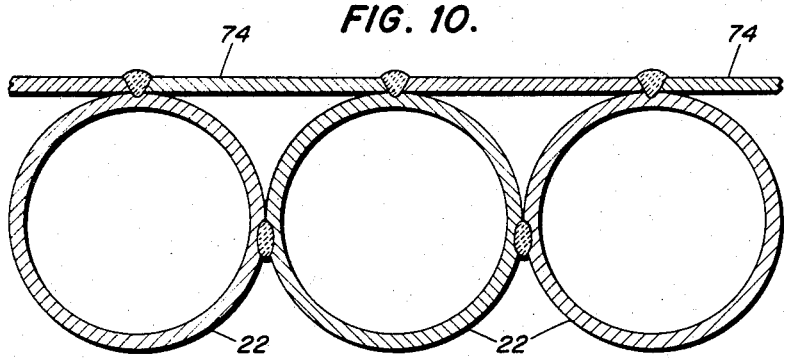

In FIGURE 10 pipe 22 is joined by a single weld at the lateral edges thereof and is then provided with a flat plate 74 welded to the outer edges of the pipe. This embodiment is preferred for tanks in which the insulation is hung on the outer tank wall and provides a flat relatively smooth surface for this purpose.

In all embodiments described above a solid integral path can be traced from that part of the wall which contacts the liquid to the outermost extremity of the wall. However, the chances of a crack propagating this path is extremely remote since the tendency of crack propagation within a pipe is radial and not tangential around the circumference of a pipe. By the same token, a crack taking the shortest path available to it will not propagate from one flange 68 to the other of FIGURE 8, but instead will most likely confine itself to the flange in which it originated. For this reason, the design of the tubular wall construction presented herein meets all standards of safety and presents a primary and secondary or backup barrier for the liquid as required by present Coast Guard regulations.

Figure 11:
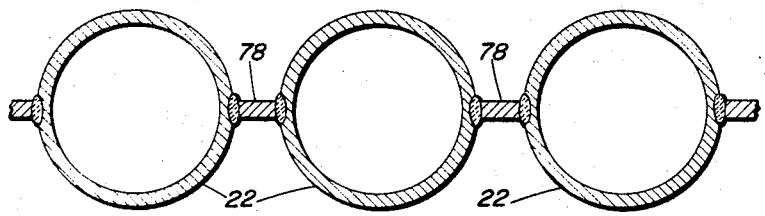
FIGURE 11 is a transverse section of yet another wall construction design wherein parts of the wall provide but a single barrier.

The embodiment of FIGURE 11 can be used in small stationary tanks. This embodiment comprises pipes 22 having a smaller diameter than for ship mounted tanks and interconnected by a single elongated flat bar 78 welded symmetrically between adjacent pipes 22.

It should be understood that various modifications can be made to the herein disclosed examples of the present invention without departing from the spirit and scope thereof.

What is claimed is:

1. A storage tank for storing liquefied gas at about ambient pressure comprising a top wall, a bottom wall, four upstanding side walls, each of said walls being formed of a plurality of parallel tubes with their axes lying in the plane of their respective wall and joining means connecting adjacent tubes together to form a liquid-tight barrier comprising at least in part a weld for each tube which extends parallel to the axis of each tube and runs longitudinally along a part of the outside surface of the tube, and a plurality of stiffening members mounted to the walls of the tank extending horizontally around the upstanding walls and being spaced vertically from each other.

2. A tank as set forth in claim 1 wherein box girders are provided along the horizontal edges of the tank mounted to the respective ends of the tubes in the walls, said box girders being of hollow construction and having openings registering with the end openings of the tubes so that the box girders serve as part of a header system for the tubes of the walls.

3. A tank as set forth in claim 1 wherein adjacent tubes are joined by a pair of welded seams only, the welded seams being spaced transversely of the thickness of the wall.

4. A tank as set forth in claim 1 wherein each said stiffening member comprises a U-shaped channel with the web thereof arranged generally horizontally.

5. A tank as set forth in claim 1 wherein adjacent tubes are spaced laterally from each other in the direction of the plane of the wall, and adjacent tubes are connected together by a pair of plates extending from each tube to the next adjacent pipe and being welded to said each and next adjacent tube.

6. A tank as set forth in claim 5 wherein said plates contact said tubes tangentially.

7. A tank as set forth in claim 5 wherein said plates are joined together at their longitudinal edges by plates of arcuate cross section to form a hollow box-beam construction with the plates of arcuate cross section of the box-beam being welded to adjacent tubes.

8. A tank as set forth in claim 5 wherein said plates butt against said tubes.

9. A tank as set forth in claim 8 wherein said plates are interconnected by a web paralleling the axes of the tubes and with its plane extending perpendicularly to the plane of the wall.

10. A tank as set forth in claim 1 wherein adjacent tubes are connected to a welded seam and flat plates are provided tangentially welded to one side of the tubes.

11. A tank as set forth in claim 10 wherein said flat plates are mounted on the outside of the wall.

12. A tank as set forth in claim 1 in combination with a ship, said ship including means for supporting the tank within the hull thereof, tubes of the top and bottom walls of said tank extending in the athwartship direction.

13. A tank as set forth in claim 12 wherein insulation means is lined on the bulkheads of said ship surrounding said tank.

14. A tank as set forth in claim 12 wherein said tank comprises a center line upstanding bulkhead also formed of a plurality of parallel tubes with the tubes thereof extending vertically.

References Cited

UNITED STATES PATENTS

| | | | |
|---|---|---|---|
| 2,085,313 | 6/1937 | Guthrie. | |
| 2,817,484 | 12/1957 | Stenzel | 220—83 X |
| 2,820,568 | 1/1958 | Zick et al. | 220—22 |
| 2,844,271 | 7/1958 | Shelton | 220—83 X |
| 2,896,416 | 7/1959 | Henry. | |
| 3,064,612 | 11/1962 | Gardner et al. | |
| 3,252,610 | 5/1966 | Greenlee | 220—83 X |

FOREIGN PATENTS

| | | |
|---|---|---|
| 1,007,252 | 2/1952 | France. |
| 1,347,589 | 11/1963 | France. |
| 640,387 | 5/1962 | Italy. |

MARTHA L. RICE, *Primary Examiner.*

JAMES R. GARRETT, *Assistant Examiner.*